US010261892B2

(12) United States Patent
Patel et al.

(10) Patent No.: US 10,261,892 B2
(45) Date of Patent: Apr. 16, 2019

(54) CLOUD-BASED AUTOMATED TEST EXECUTION FACTORY

(71) Applicant: Bank of America Corporation, Charlotte, NC (US)

(72) Inventors: Akshay Patel, Cary, NC (US); Alexander Arkadyev, Thornhill (CA); Ramesh Sharma, Toronto (CA)

(73) Assignee: Bank of America Corporation, Charlotte, NC (US)

( * ) Notice: Subject to any disclaimer, the term of this patent is extended or adjusted under 35 U.S.C. 154(b) by 140 days.

(21) Appl. No.: 15/603,687

(22) Filed: May 24, 2017

(65) Prior Publication Data

US 2018/0341573 A1    Nov. 29, 2018

(51) Int. Cl.
G06F 11/00    (2006.01)
G06F 11/36    (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC .................................................. G06F 11/321
See application file for complete search history.

(56) References Cited

U.S. PATENT DOCUMENTS

| | | | |
|---|---|---|---|
| 6,182,245 B1 | 1/2001 | Akin et al. | |
| 6,304,982 B1 | 10/2001 | Mongan et al. | |
| 6,446,109 B2 | 9/2002 | Gupta | |
| 7,451,163 B2 | 11/2008 | Selman et al. | |
| 7,827,565 B2 | 11/2010 | Minium, Jr. et al. | |
| 8,533,676 B2 | 9/2013 | Watters et al. | |
| 8,745,585 B2 | 6/2014 | Watters et al. | |
| 8,881,109 B1* | 11/2014 | Bridges, Sr. .......... | G06F 11/263 717/125 |
| 9,053,238 B2 | 6/2015 | Krishnan et al. | |
| 9,058,430 B2 | 6/2015 | Pal et al. | |
| 9,092,578 B2 | 7/2015 | Wefers | |
| 9,116,779 B2 | 8/2015 | McClamroch et al. | |
| 9,164,759 B2 | 10/2015 | McClamroch et al. | |
| 9,459,839 B2 | 10/2016 | Kisynski et al. | |
| 9,576,252 B2 | 2/2017 | Haber | |

(Continued)

OTHER PUBLICATIONS

"Jenkins (Software)", Wikimedia Foundation, Inc., Apr. 13, 2017.

*Primary Examiner* — Christopher S McCarthy
(74) *Attorney, Agent, or Firm* — Weiss & Arons LLP; Michael A. Springs, Esq.

(57) ABSTRACT

Method and apparatus for efficient test execution in a testing environment is provided. The method may include a test file. The test file may include one or more test cases for test execution. The test execution request may include one or more test files. The method may further use an execution server for the handling and the managing of the test request. The method may further use a plurality of agents. The agents may process and execute the test execution requests that are being handled and managed by the execution server. The processing and the executing of the test requests may produce real-time execution test results. The method may further cause the execution server to connect, in real-time, to the agent. The agent may display, on a GUI, the real-time status of the test execution requests.

23 Claims, 14 Drawing Sheets

(56) References Cited

U.S. PATENT DOCUMENTS

| | | | |
|---|---|---|---|
| 2004/0128651 A1* | 7/2004 | Lau | G06F 11/3664 |
| | | | 717/124 |
| 2005/0204343 A1* | 9/2005 | Kisamore | G06F 11/3688 |
| | | | 717/124 |
| 2008/0059838 A1* | 3/2008 | Melman | G01R 31/318314 |
| | | | 714/25 |
| 2011/0106496 A1* | 5/2011 | Napolin | G06Q 10/06 |
| | | | 702/182 |
| 2013/0097586 A1* | 4/2013 | Chandra | G06F 11/3684 |
| | | | 717/124 |
| 2013/0198320 A1* | 8/2013 | Ahmed | G06F 11/3664 |
| | | | 709/217 |
| 2013/0263090 A1* | 10/2013 | Polk | G06F 11/3672 |
| | | | 717/124 |
| 2015/0100832 A1* | 4/2015 | Nanjundappa | G06F 11/3688 |
| | | | 714/38.14 |
| 2016/0004628 A1* | 1/2016 | Gugri | G06F 11/3688 |
| | | | 717/124 |
| 2016/0140033 A1* | 5/2016 | Alexeevich | G06F 11/3688 |
| | | | 717/125 |
| 2016/0188450 A1* | 6/2016 | Appusamy | G06F 11/3664 |
| | | | 714/38.1 |
| 2017/0078159 A1 | 3/2017 | Bae et al. | |
| 2018/0253365 A1* | 9/2018 | Dutta | G06F 11/2294 |

\* cited by examiner

Machine Summary:

Home | Test Execution Dashboard | Test Execution Request | Test Execution Request ▾ | Test Execution Request ▾ | Test Execution Machine ▾

Home > Agents Summary — 402

400 ↘

| Agent Name | Description | Status | Host Name | IP Address | Project | Shared Drive | Last Updated (EST) | Agent Version |
|---|---|---|---|---|---|---|---|---|
| | | All ▾ | | | | | | |
| PRA | Regression Testing | ○ | GX0N12524 | 123.24.56.7 | | C | 03/10 04:18 | 1.6.2 Alpha |
| RegPRA | Regression | ○ | GWAM12524 | 170.56.893.21 | | C | 03/09 09:21 | 1.6.2 Alpha |
| Shvtopa | Dev Machine | ⊖ | VFDRM0009197 | 30.712.521 | EF, EFQTP, EF.. | C:\ | 03/07 07:33 | 1.5 Alpha |
| TCA-NA-F22 | Testlab Machine | ⊖⊜ | VFDR056848 | 165.232.70.651 | TestProjSelen... | C:\ | 03/18 11:37 | 1.6.5Alpha |
| TCA-RQ-F6-40 | Testing | ○ | VF0050658A | 165.18.64.05 | TestProjSelen... | C:\ | 03/21 11:27 | 1.6.5Alpha |
| TCA-RQ-F6-41 | EF Testing | ⊖ | VFR005962A | 165.18.64.06 | TestProjSelen... | C:\ | 03/21 11:27 | 1.6.5Alpha |
| TCA-RQ-F6-42 | EF Testing | ○ | VF00206823 | 165.18.64.08 | TestProjSelen... | C:\ | 03/21 08:41 | 1.6.5Alpha |
| Jackitfa DRA | EF Testing | ⊖ | VF00204228 | 165.18.64.73 | TestSimple | C:\ | 03/12 23:33 | 1.6.0Alpha |
| DVA-CRH-AP-123 | Dev Machine | ⊖ | VFAR43254 | 165.18.64.84 | TestProjSelen | C:\ | 03/06 08:26 | 1.3 Alpha |
| DVF-CRH-AR-456 | Dev Machine | ○ | VF0GM225 | 165.18.64.83 | FSA | O | 03/21 11:22 | 1.6.5Alpha |
| DVF-CRH-AR-789 | Execution Machine | ○ | VFBC1226A | 50.515.521.84 | FSA | O | 03/20 09:46 | 1.6.5Alpha |
| DVF-CRH-AR-001 | Execution Machine | ⊖⊜ | VF96270001 | 50.515.521.89 | | O | 03/20 09:47 | 1.6.5Alpha |
| DVF-CRH-AR-002 | Execution Machine | ⊖⊜ | VF882AB12 | 50.515.521.90 | TestProjSelen | O | 03/21 07:14 | 1.6.5Alpha |
| DVF-CRH-AR-003 | EF Testing | ⊖⊜ | VF882BA54 | 50.515.521.76 | TestProjUFT | C | 03/21 11:27 | 1.6.5Alpha |

Machine States: ○ Online ○ Offline ○ Busy ○ Needs Attention ○ Standalone ⊕ Locked

FIG. 4

EXECUTION FACTORY

Home | Test Execution Dashboard | Test Execution Request ▾ | Test Execution Machine ▾

Home > Test Execution Request > Edit

500 →

502 — 1.General Details 〉 2.Select Tests 〉 3.Select Agent 〉 4.Execution Details 〉

504 — Name: Copy of TRS + 1
506 — Project: Proj. 1
508 — Tool: Selenium
510 — Request Type: Regression Test
512 — Description: Enter description 514 — Email to: Enter email ID  ☐ Disable 516 — Email Options:
518 — ☐ On Request Completion
520 — ☐ On Tests Completion
522 — ☐ Request Progress at Fixed Interval Admin Email to: ☐ Enter email ID  ☐ Disable

[Cancel] [Continue] — 524

FIG. 5

EXECUTION FACTORY

Test Automation Execution Made Efficient

Home | Test Execution Dashboard | Test Execution Request ▾ | Test Execution Machine ▾

Home > Test Execution Dashboard — 902

New Requests | In-Progress Requests | Closed Requests
904   906                           908

| Req ID | Request Name | Project Name | State | Start Time (EST) | Last Updated (EST) | Test File Counts ||||| |
|--------|--------------|--------------|-------|------------------|--------------------|---|---|---|---|---|
|        |              |              |       |                  |                    | P | W | IP | C | NC | Total |
| 123567 | Create_Request_for_testing | AB | W IP C | 3/21 08:26 | 3/21 08:26 | - | 2 | - | - | - | 2 |
| 109778 | createrequest for testing | PROJTEST1 | W IP C | 3/21 08:07 | 3/21 08:07 | - | 1 | - | - | - | 1 |
| 124653 | CreateRequestSet2 | PROJTEST1 | W IP C | 3/21 07:43 | 3/21 07:43 | - | 1 | - | - | - | 1 |
| 1005778 | Test FIR1 | PROJTEST1 | W IP C | 3/21 06:38 | 3/21 08:17 | - | - | - | 11 | 11 | 11 |
| 100579 | Selenium_timeout_check | PRA | W IP C | 3/21 06:06 | 3/21 06:47 | - | - | - | 20 | - | 20 |
| 252876 | Selenium_test_1_20 | PRA | W IP C | 3/21 02:45 | 3/21 05:50 | - | - | - | 30 | - | 30 |
| 252877 | sel_test_21 | PRA | NC | 3/21 02:30 | 3/21 05:36 | - | - | - | 6 | 2 | 8 |
| 252878 | TestUFT15 Cloned | PROJTESTABC | NC | 3/20 11:56 | 3/21 02:26 | - | - | - | - | 16 | 16 |
| 252879 | TestUFT15 | PROJTESTABC | W IP C | 3/20 07:10 | 3/20 08:13 | - | - | - | 16 | - | 16 |
| 252000 | Selenium_test_1_20 | PRA | W IP C | 3/20 05:04 | 3/21 02:26 | - | - | - | 30 | - | 30 |
| 252001 | Selenium_test_20 | PRA | W IP C | 3/20 04:53 | 3/20 05:34 | - | - | - | 25 | - | 25 |
| 252002 | TestTime76 | PROJTEST1 | W IP C | 3/20 03:35 | 3/20 04:59 | - | - | - | 7 | - | 7 |
| 252003 | ESTTimeTest | PROJTEST1 | W IP C | 3/20 02:45 | 3/20 03:45 | - | - | - | 10 | - | 10 |

States: [N] New [P] Paused [W] Waiting [IP] In Progress [C] Completed [NC] Not Completed [Cl] Closed

FIG. 9

EXECUTION FACTORY
Test Automation Execution Made Efficient

Home | Test Execution Dashboard | Test Execution Request ▾ | Test Execution Machine ▾

Home > Test Execution Dashboard

New Requests | In-Progress Requests | Closed Requests

| Request ID | Request Name | Project Name | State | Start Time (EST) | Last Updated(EST) | P | W | IP | C | NC | Total |
|---|---|---|---|---|---|---|---|---|---|---|---|
| | | | All ▾ | | | | | | | | |
| 200124 | Copy of TestUFT 1-6-5 | AB | C | 03/21 06:28 | 03/21 06:28 | - | 21 | - | - | - | 21 |
| 200422 | Copy of Copy of sel_test | PRA | C | 03/21 06:27 | 03/21 06:27 | - | 8 | - | - | - | 8 |
| 200423 | Copy of Copy of sel_test_ | ProjTest1 | C | 03/21 06:27 | 03/21 06:27 | - | 8 | - | - | - | 8 |
| 200489 | Copied Request Test | ProjTest1 | C | 03/21 06:27 | 03/17 06:27 | - | 8 | - | - | - | 8 |
| 200511 | uh_test_nc17 | PRA | C | 03/17 03:33 | 03/17 03:36 | - | 10 | - | - | 5 | 15 |
| 200519 | TestRequest_02_Edit_Check | PRA | C | 03/17 03:18 | 03/17 03:18 | - | 5 | - | - | - | 5 |
| 200096 | TestRequest_01_Edit_Check | AB | C | 03/17 03:01 | 03/18 00:19 | - | 10 | - | - | - | 10 |
| 200678 | TestSele1-6-4 | AB | C | 03/15 08:33 | 03/18 00:00 | - | - | 20 | - | - | 20 |
| 200876 | TestUFT1-6-4 | ProjTest1 | C | 03/15 08:09 | 03/18 00:00 | - | 19 | 19 | - | - | 19 |
| 200931 | testuft_7mac | ProjTest1 | C | 03/15 03:57 | 03/18 00:00 | - | 16 | 16 | - | - | 16 |
| 200932 | TestUFT1-6-2 | ProjTest1 | C | 03/15 03:14 | 03/18 00:00 | - | 17 | 17 | - | - | 17 |
| 200244 | TestSele1-6-2 | ProjTest1 | C | 03/15 02:57 | 03/18 00:00 | - | 10 | 10 | - | - | 10 |
| 200125 | uft_exection | PRA | C | 03/15 02:14 | 03/18 00:00 | - | 10 | 10 | - | - | 10 |

States: [N] New [P] Paused [W] Waiting [IP] In Progress [C] Completed [NC] Not Completed [Cl] Closed

FIG. 11

EXECUTION FACTORY

Home | Test Execution Dashboard | Test Execution Request ▾ | Test Execution Agent ▾

Home > Test Execution Dashboard > Request Machines

Test Files | Agents — 1202

| S. No. | Agent Name | Status | Request ID | Test File Name | Start Time (EST) |
|---|---|---|---|---|---|
| | | All ▾ | | | |
| 1 | TRQ-MP-86-51 | ⊙ | | | |
| 2 | DVP-PQR-91-20 | ⊙ | | | |

EXECUTION FACTORY

Home | Test Execution Dashboard | Test Execution Request ▾ | Test Execution Agent ▾

Home > Test Execution Dashboard > Test Files Summary > Test File Runs

Test Files | Agents

| | | |
|---|---|---|
| ID | 200633 | Test File Name | FS_5F_feature |
| Name | Selenium_timeout_check | Test File State | MIPIC |
| State | MIPIC | | |

| Run ID | Test File Name | Agent Name | Start Time (EST) | Duration | Test Case Counts | | | | | Results | Result Path |
|---|---|---|---|---|---|---|---|---|---|---|---|
| | | | | | Pass | Fail | Warn | Skip | Total | All ▾ | |
| 4494 | FS_5F_feature | DPR-12-345 | 3/21 11:18 | 36s | 5 | | | | 6 | ○ | ○\AutomationT... |

FIG. 12

EXECUTION FACTORY

Home | Test Execution Dashboard | Test Execution Request ▾ | Test Execution Agent ▾

Home > Test Execution Dashboard > Test Files Summary

[Test Files] [Machines]

| ID | Name | State | Result | Start Time (EST) | Duration | | |
|---|---|---|---|---|---|---|---|
| 100635 | Selenium_timeout-ch | W F C | ○ | 03/21 06:06 | 2hr 35m | | |

100% Complete    Run By: John Smith

| | | | | | | Pass | Fail | Warning | Skip | Total |
|---|---|---|---|---|---|---|---|---|---|---|
| | | | | | | | | | | 194 |

| S No | Test File Name | Agent Name | State | Start Time (EST) | Duration | Non-Conc Tags | Test Case Counts | | | | Result |
|---|---|---|---|---|---|---|---|---|---|---|---|
| | | | All ▾ | | | | Pass | Fail | Warn | Skip | Total | All ▾ |
| 1 | FS_5F_5 feature | BCA-VT-123 | W F C | 03/21 11:18 | 36s | | • | • | • | 5 | 5 | ○ |
| 2 | FS_5F_6 feature | BCA-VT-456 | W F C | 03/21 11:22 | 46s | | • | • | • | 5 | 5 | ○ |
| 3 | FS_5F_7 feature | BCA-VT-789 | W F C | 03/21 11:07 | 42s | | • | • | • | 5 | 5 | ○ |
| 4 | FS_5F_8 feature | VPQ-RC-489 | W F C | 03/21 11:24 | 47s | | • | • | • | 5 | 5 | ○ |
| 5 | FS_5F_1 feature | VPG-RC-422 | W F C | 03/21 11:32 | 13m14s | | 5 | • | • | 5 | 5 | ⊘ |
| 6 | FS_5F_2 feature | VPG-RC-123 | W F C | 03/21 11:20 | 13m39s | | 5 | • | • | 5 | 5 | ⊘ |
| 7 | FS_5F_3 feature | BCA-VT-153 | W F C | 03/21 11:34 | 11m57s | | 5 | • | • | 5 | 5 | ⊘ |
| 8 | FS_5F_4 feature | BCA-VT-764 | W F C | 03/21 11:14 | 13m17s | | 5 | • | • | 5 | 5 | ⊘ |

[N] New  [P] Paused  [W] Waiting  [IP] In Progress  [NC] Not Completed  [CL] Closed
⊘ Pass  ⊘ Fail  ⊘ Warning  ⊘ Skip  ○ No Run

FIG. 13

CLOUD-BASED AUTOMATED TEST EXECUTION FACTORY

FIELD OF TECHNOLOGY

Aspects of the invention relate to building a system that simplifies the automated test execution in a testing environment. In particular, the invention relates to real-time monitoring of test execution in a testing environment.

BACKGROUND OF THE DISCLOSURE

Systems for test execution may include lengthy electronic forms. Such forms may include numerous fields. The fields may require input of data related to the test files. Such data may be required in preparation for test execution. The more user input necessary, the proportionally greater the chance that exists for error to occur in the process of the execution of test files.

Many systems provide the use of a single machine, or a limited amount of machines, for the execution of the test files. This shortage of machines lengthens, extensively, the time it takes to process and execute the numerous test files waiting to be tested. This is an additional challenge in the testing environment.

It would be desirable, therefore, to provide apparatus and methods for simplifying test execution using real-time monitoring, in a testing environment.

SUMMARY OF THE DISCLOSURE

An architecture for handling test execution in a testing environment is provided. The architecture may comprise a request for test execution. The request may comprise one or more test files for test execution.

The submission of the request may be triggered by an application program interface ("API"), graphical user interface ("GUI"), or a pre-scheduled event.

The submission of the request may be submitted through a GUI via a web-service that may transmit the request.

The GUI may be configured to display a test execution dashboard. The test execution dashboard may comprise input-data-type fields which may be configured to receive the test files identification information. The information may be submitted as part of the request for test execution.

The input-data-type fields on the test execution dashboard may be limited to limited-selection fields for user data entry. Furthermore, the limited-selection fields may be predictive-type fields i.e. drop-down menus, which may enable limiting user input.

The limiting of user input on the test execution dashboard may enable for simplification of the test execution and limit the possibility for error to occur.

The identification information input-data-type fields may comprise an email address data-type field. In response to entry of an email address, the system may provide additional optional services. These services may include real-time status updates. These updates may include emails that confirm receipt of notification based on various execution events.

The receipt of a notification based on the email addresses submitted to the email address data-type field, enables users associated with the email address to be notified of the status (i.e. error, completed) of the execution of the test file.

The architecture may further comprise a plurality of agents that may process and execute the large number of test execution requests. The plurality of agents may be physical machines and/or virtual machines. The processing and executing of the requests may enable for real-time test execution results.

The agents may be tool agnostic and may be configured to support all standard tools. The agents may not be affiliated with any specific tool. The standard tools may comprise frameworks such as Cucumber, Selenium, Unified Functional Testing ("UFT"), and/or other standard tools.

The agents may be scalable and adaptable. The agents may be enabled to scale-up or scale-down on demand. The agents may process and handle large test requests. The agents may process and handle small test requests. The agents may be flexible to, preferably, any size request.

The plurality of agents may simultaneously, process and run test files in parallel with one another. This simultaneous processing enables for rapid production of test execution requests.

In certain embodiments, each test request may be accompanied by a tag that may be connected to, or otherwise associated with, a tagging system. The tag may define whether there may be dependencies between test requests. This tagging system enables the server to handle each tagged request appropriately. For example, in certain situations, the test request should not be run concurrently with another test request. In another situation, a test request may be only executed after a different test request is completed.

The architecture may further comprise an execution server. The execution server may be configured to receive the test request transmitted via the web-service. The execution server may further be enabled to determine the format-type for each of the test files included in the test execution request.

The server may track the information relating to each of the format-types for each test file. The information relating to the format-types may be determined by the execution server tracking the execution at each of the plurality of agents. The execution server may then further store the information for assistance in future submissions.

The execution server may then be enabled, in the future, where a submission of a pre-determined format-type test file may be submitted, the server may allocate the pre-determined format-type test file to an agent that may have historically performed a test execution for a same or similar format-type test file within a pre-determined time period.

The agent may execute the test request for each of the test files. The agent may further be enabled, during the execution process of the test requests, to provide real-time status on an agent dashboard, displayed on the GUI, for each task associated within a test file for each of the plurality of agents.

The execution server may be further configured to, in the event where an error occurs during a test execution process, pause the agent's execution, with a single-click, until the error has been corrected. When an error in the test execution has been corrected, the execution server may then, with a single-click, resume execution at the same point in the test file process where execution has been paused.

The pause functionality may also prevent a new test request from initiating, until the error has been corrected. The suspension of the execution of a new test request may enable the execution server to repair issues occurring in the system and/or environment that may have an effect on the new test request's execution.

The execution server may further track the runtime for each format-type test file being executed on the agent. Based on the tracking of the runtime for each format-type test file, the server may determine an effected runtime for each format-type test file.

In the event where a submission of a same or similar format-type test file may be submitted, the execution server may be configured to allocate the test file to the agent that may have an availability of time equal to or greater than the expected runtime for the format-type test file associated with the allocated test file.

Furthermore, the execution server may also track the runtime to predict the future execution's predicted completion time for a historically previously-determined format-type runtime.

The web-service within the architecture may transmit test execution results from the agent to the execution server. The execution server may then be configured to publish the test execution results in a standardized report. The report may be standard despite the type of tool used and/or despite the format-type of the test file.

The GUI may be configured to display a report viewer. The report viewer may display real-time test execution results as a standardized report published within the execution server.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows illustrative portions of a GUI in accordance with principles of the invention.

FIG. 5 shows illustrative portions of a GUI in accordance with principles of the invention.

FIG. 9 shows illustrative portions of a GUI in accordance with principles of the invention.

FIG. 11 shows illustrative portions of a GUI in accordance with principles of the invention.

FIG. 12 shows illustrative portions of a GUI in accordance with principles of the invention.

FIG. 13 shows illustrative portions of a GUI in accordance with principles of the invention.

DETAILED DESCRIPTION OF THE DISCLOSURE

Figure 1:
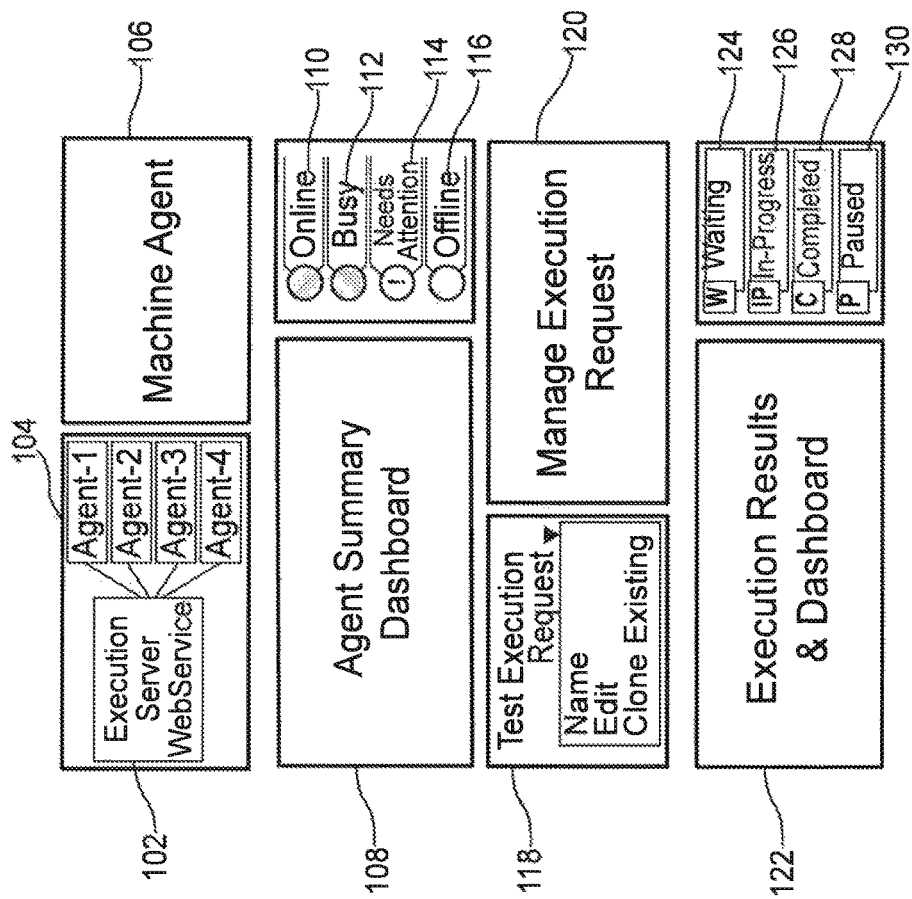
FIG. 1 shows illustrative portions of a GUI in accordance with principles of the invention.

A method for efficient test execution in a testing environment is provided. In some embodiments, the method may be configured to act on a test request. The test execution request may include one or more test files for test execution. The method may further use an execution server for the handling and the managing of the test request.

The method may further use a plurality of agents. The agents may process and execute the test execution requests that are being handled and managed by the execution server.

The processing and the executing of the test requests may produce real-time test execution results.

The method may be used in connection with a GUI. The GUI may be configured to display, during the process of test execution, either one or more of several types of dashboards.

One of the types of dashboards may include a test execution dashboard. The test execution dashboard may include input-data-type fields which may be configured to receive the test files identification information submitted as part of the request.

When a test request is submitted, it may be associated with a specific project type. The particular project type may use a specific framework (i.e. Cucumber, Selenium, UFT) as the tool for testing. In the event that a new request is submitted that is associated with a project type previously executed, the server may, automatically, identify the tools necessary to perform the execution.

For example, in the event that a specific project type uses UFT for regression executions, then, in the event that a new request is submitted and characterized under the same project type as previously executed, the server is enabled to automatically assign UFT as the tool, and regression as the request type, for that project.

The method may further have the GUI display an additional dashboard. The dashboard may include an agent dashboard. The agent dashboard may display real-time status of task requests associated with each of the plurality of agents.

The method may further have the GUI display a report dashboard. The report dashboard may display real-time test execution results in a standardized report.

The method may further use one or more web-services. The web-service may communicate and transmit data between the GUI and the execution server. The web-service may further communicate and transmit data between the execution server and the plurality of agents.

The method may utilize real-time monitoring of execution requests and results.

The method may include submitting the test execution request to the test execution dashboard in the GUI. The method may further comprise transmitting the test execution request, via the web-service, to the execution server.

The method may further include the execution server determining the format-type for each of the test files included in the test execution request.

The method may further include processing each of the test execution requests.

The method may further allocate each of the test files to the corresponding agent based on the format-type of the test file. In the event where an agent does not have a tool configured to complete the format-type test request, the agent may retrieve and download the tool for further execution. The agent may further store the tool for future intelligent linking—i.e. linking new test files to an "experienced" agent based on the type of performed tasks by the agent in the past. The future intelligent linking may be for linking, in the future, intelligently, one or more agents to one or more of the test files.

Upon the execution server allocating the test files, the agent may execute each of the test files.

The method may further retrieve and download a configuration file. The configuration file may include a file path and an environment. The configuration file may enable a connection between the agent and an API associated with the configuration file to enable further execution of the format-type test request. The agent may then store the configuration file for correspondence of one or more agents to one or more of test files, in future submissions.

The method may further comprise the execution server to connect, in real-time, to the agent. The agent may display the real-time status of the requests on the agent dashboard in the GUI.

Upon completion of the agents running the test execution request, the method may include transmitting the test execution results to the server. In certain embodiments, the results may be transmitted via the web-service, to the server.

The method may further comprise the execution server, publishing the test execution results in a standardized report.

The execution server may further be configured to display the standardized report on the report viewer in the GUI.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative portions of a GUI in accordance with principles of the invention. Execution server Web Service 102 is in communication with a plurality of agents 104. Machine Agent 106 shows a selected Agent 104.

Agent Summary Dashboard 108 may display the status of each of the agents 104. Status "Online" 110 may refer to an agent being available for a test request. Status "Busy" 112 may refer to an agent currently executing a test request. Status "Needs Attention" 114 may refer to a failure in the execution of the request. Status "Offline" 116 may refer to an agent not being available for a test request.

Manage execution request 120 shows a selected test Execution Request 118. Test Execution Request 118 may be configured to accept input-data related to the test requests. Execution Results and Dashboard 122 may display the status of each of the test requests. Status "Waiting" 124 may refer to a Test Request 118 waiting for an available agent. Status "In-Progress" 126 may refer to the test request currently undergoing execution. Status "Completed" 128 may refer to the completion of the test request. Status "Paused" 130 may refer to the suspension of the execution of the test request. Execution of the test request may be paused for any of the following reasons (or for any other suitable reason):

a. to enable the execution server or agent to repair the error prior to completion of the execution;
b. to prevent new test requests from starting until the error has been corrected; or
c. any other of a number of suitable reasons.

The suspension of the execution of new test requests may further enable the execution server to repair issues occurring in the system and/or environment that may have an effect on the new test request's execution.

Figure 2:
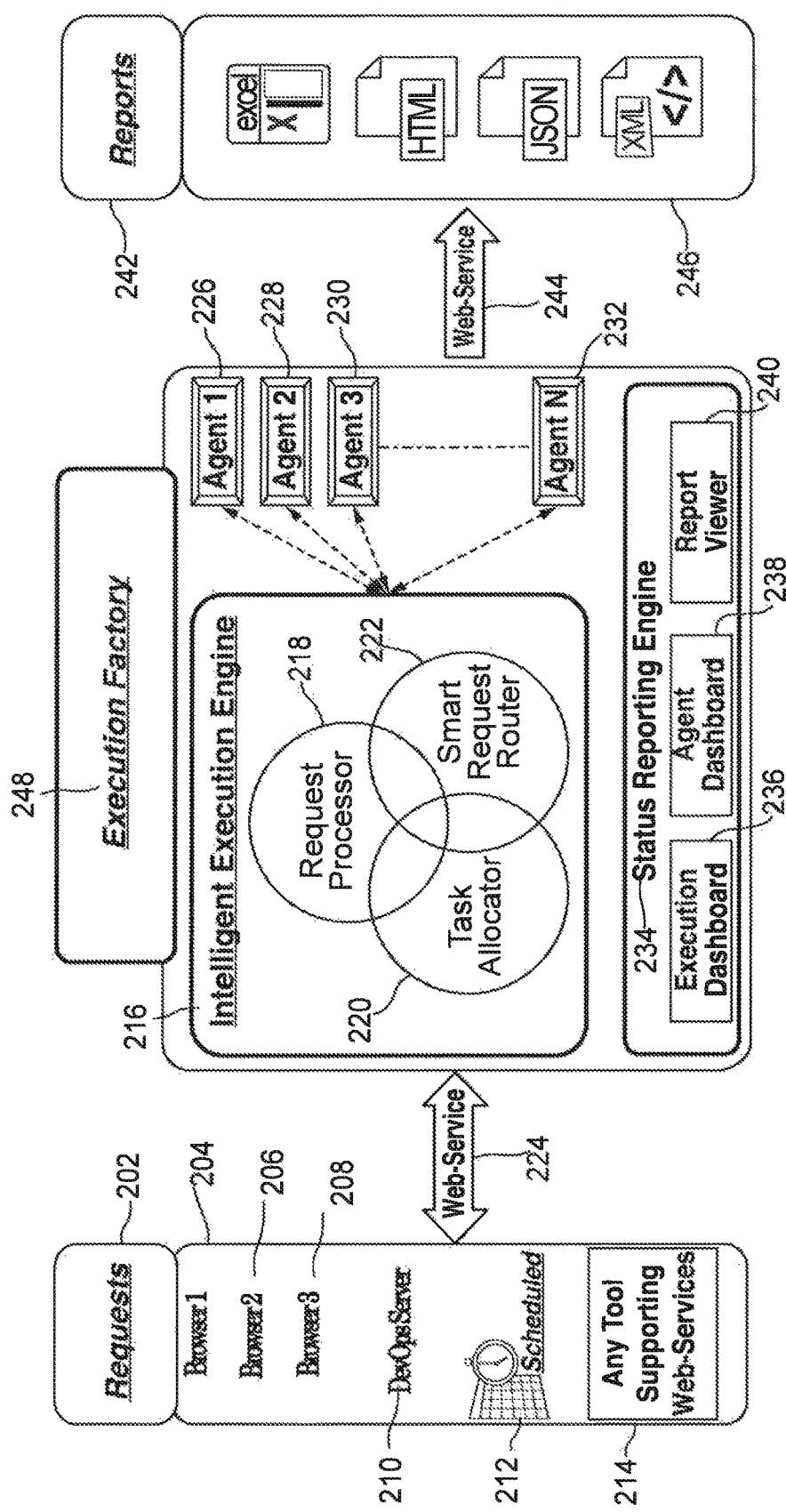
FIG. 2 shows an illustrative system architecture in accordance with principles of the invention.

FIG. 2 shows an illustrative system architecture in accordance with principles of the invention. The test requests as shown at 202 may originate from different sources. The sources may include various Web Browsers 204, 206, and 208. The sources may include DevOps Server 210 or any other suitable server. The sources may include Scheduled Requests 212. The sources may also include any other suitable sources 214. Any one of browsers 1, 2, and 3 shown at 204, 206, and 208, may be a source for a test request.

Execution Factory 248 may preferably include Intelligent Execution Engine 216 which is referred to alternately herein as the "Execution Server", agents 226-232, and a Status Reporting Engine GUI 234. Web-Service 224 may transmit the test requests at 202 to execution server 216.

Execution Server 216 may be configured to process the request as seen at 218. Execution Server 216 may also be configured to allocate the tasks at Task Allocator 220, to one of the agents as seen at 226, 228, 230 and 232. Agents 1, 2, 3, ... N as seen at 226-232 are in, preferably constant communication with execution server 216.

Task Allocator 220 and Smart Request Router 222 may enable the Execution Server 216 to allocate the Test Requests at 202 to an appropriate agent based on previously-determined information of the user submitting the test request and/or based on previous requests that may be the same or similar to the current request.

GUI 234 may display an Execution Dashboard 236, an Agent Dashboard 238 and/or a Report Viewer 240. Report Viewer 240 may be configured to display a standardized report 242 despite the different format-type files 246. Web-Service 244 may transmit the test execution results.

Figure 3:
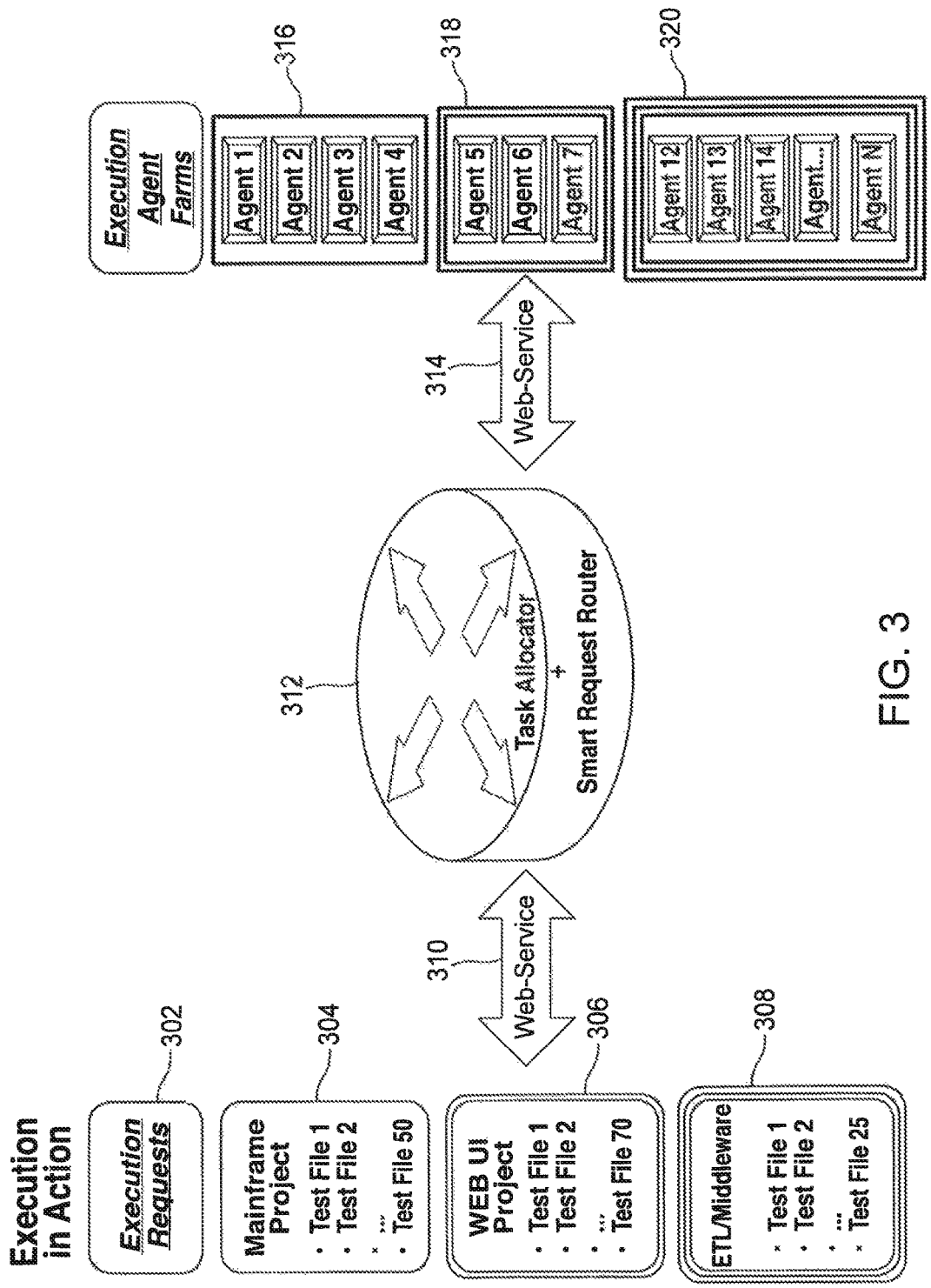
FIG. 3 shows an illustrative system architecture in accordance with principles of the invention.

FIG. 3 shows another illustrative system architecture in accordance with principles of the invention. Execution request 302 may include various project types. Mainframe Project 304, Web GUI Project 306 and ETL (extract, transform, load)/middleware Project 308 may include various test files. Each test file may require different tools and software to complete its task.

Projects 304, 306, and 308 may be transmitted to Task Allocator 312 (also referred to herein as the server) via Web-Service 310. The test files within Projects 304, 306, and 308 may be assigned to one of the agents displayed at 316, 318, and 320, by task allocator 312. The allocation of each of the test files in projects 304, 306, and 308, to a corresponding agent may be based, at least in part, on the format-type of the test file. Task Allocator 312 and the agents at 316-320 may be in constant communication via web-service 314. In the event where a submission of a pre-determined format-type test file is submitted, task allocator 312 may allocate the pre-determined format-type test file to any one of agents at 316, 318 and 320 that may have historically performed a test execution for a same or similar format-type test file within a pre-determined time period.

In the event where a test file may require a specific tool to complete the test request, the server may assign the test file to an agent that, historically, previously required and downloaded the specified tool. In certain embodiments, the agent may have previously retrieved and downloaded the tool and stored it for use in future submissions.

For example, the test files in Mainframe Project 304, may be assigned to agents 1, 2, 3, and 4 as shown at 316. This assignment may be based on same or similar format-type test files that agents 1-4 shown at 316 have previously executed. Or, this assignment may be based on same or similar tools that have been previously downloaded by agents 1, 2, 3, and 4 and may now be reused for the current test files.

FIG. 4 shows illustrative portions of GUI 1400 in accordance with principles of the invention. Agent Summary Dashboard 402 may display a summary table for all agents that are in connection with the execution server.

Column Agent Name 404 may display the agent's name that may be used, in connection with the execution server. The agent's name may be a user-friendly name chosen by the user. Column Description 406 may describe the agent displayed in 404.

Column status 408 may be configured to display the real-time state of the agent. The status may be one of the states shown at key 422. Key 422 displays a distinct symbol for each of the states. The agent may be in an "Online" state 424. In the event that the status of the agent is displayed as "Online" 424, this may indicate that the agent is available, in real-time, to receive (and execute) a test request. In the event that the Status 408 of the agent is displayed as "Offline" 426, this may indicate that the agent is unavailable to receive (and execute) a test request.

In the event that the Status 408 of the agent is displayed as "Busy", as shown at 428, this may indicate that the agent is currently executing a test request. In the event that the Status 408 of the agent is displayed as "Needs Attention" 430, this may indicate a failure in the execution of the request. In the event that the Status 408 of the agent is displayed as "Standalone" 432, this may refer to the agent not being available for a test request. In the event that the Status 408 of the agent is displayed as "Locked" 434, this may refer to the agent GUI screen being currently locked.

Column Host Name 410 may display the actual name of the physical machine or virtual machine associated with the test request. Column IP Address 412 may display the IP address of the Host Name 410. Column Project 414, may display a user-friendly name which may be chosen by the user in connection with the test request being tested.

Column Shared Drive 416 may display the disk drive that Project 414 may be stored on. Column Last Updated 418, may be display the date and time the agent was last connected to the execution server. Column Agent Version 420 may show a version of the number associated with the particular agent in use.

FIG. 5 shows illustrative portions of GUI 500 in accordance with principles of the invention. GUI 500 may be a first GUI displaying search entry fields in connection with the selection of the General Details tab 502 for the test request.

Search entry field Name 504 may accept a name for the test request. Search entry field Project 506 may accept a project type that characterizes the type of project for the test execution request. Tool 508 may be a search entry field that accepts a specified framework (i.e. Cucumber, Selenium, UFT) for use as the tool in the testing process. Request Type 510 may be a search entry field accepting the type of request being submitted. For example, the test request type may be a regression test. Search entry field Description 512 may accept a more detailed description of the Request Type 510.

When a test request is submitted, it may be associated with a specific project type. The particular project type may use a specific framework (i.e. Cucumber, Selenium, UFT) as the tool for testing. In the event that a project type 506 is submitted and is linked with a project type previously executed, the server may, automatically, identify the Tool 508 and the Request Type 510 associated with the Project Type 506 and pre-populate those fields.

Search entry field Email To 514 may be configured to accept email addresses for the users that provided-or-requested, or are entitled to receive results associated with the test request. The execution server may then be enabled to send an email to the addresses entered at 514 in connection with the status of the test request.

Search entry field Email Options 516 may enable the user to select the points at which the user prefers to receive an email regarding the status of the test request.

Checkbox 518 may prompt the server to send an email upon completion of receipt of the test request. Checkbox 520 may prompt the server to send an email on completion of the execution of each test in the current test request. Checkbox 522 may prompt the server to send an email periodically throughout the progress of the test request. Specifically, to send an email at fixed intervals throughout the progress of the receipt and execution of the test request. Upon completion of the user entering data on GUI 502, the user may hit the "Continue" button as shown at 524 and a second search criterion entry field GUI in connection with the test request may be displayed.

Figure 6:
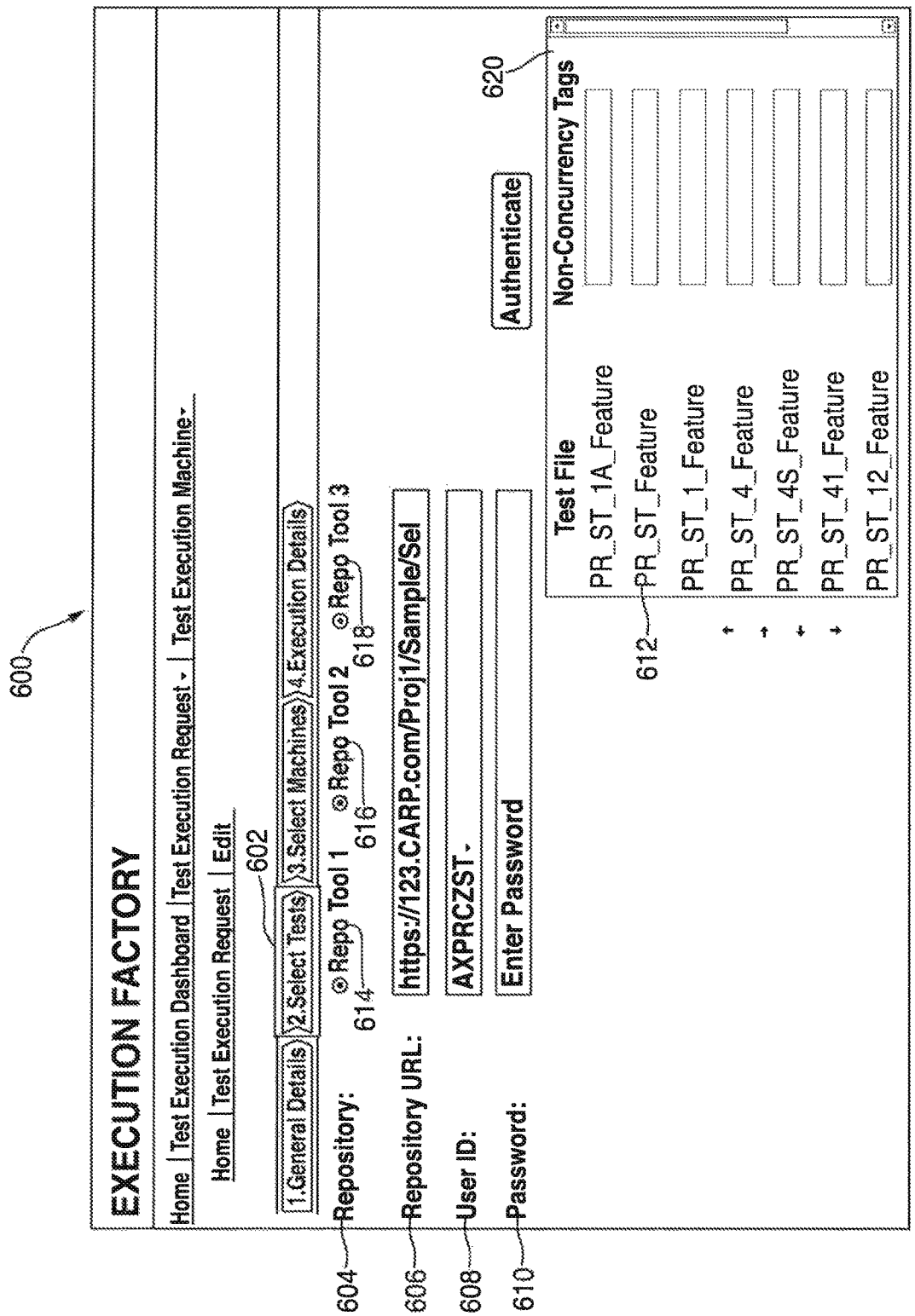
FIG. 6 shows illustrative portions of a GUI in accordance with principles of the invention.

GUI 500 may be displayed in response to a user inputting a user ID and password (as illustrated in GUI 600 shown at FIG. 6). The server, after receiving the user ID and password, may search a database for user-related data. User-related data may be stored by the server during a user's usage of the GUI's in accordance with the invention.

For example, when a user accesses the server, the server may store and track user activity. Exemplary user activity that may be stored and/or tracked includes data in connection with search entry field's Project 506, Tool 508, Request Type 510 and Email Address 514.

When the server identifies stored user-related data for a user attempting to access the server, the server may use some or all of the stored data to pre-populate one or more display fields displayed in the GUI. The server may also use stored user-related data to select data columns and/or rows displayed in the GUI.

In GUI 500, exemplary pre-populated fields may include entry fields Project 506, Tool 508, Request Type 510, and Email 514.

FIG. 6 shows illustrative portions of GUI 600 in accordance with principles of the invention. GUI 600 may be a second GUI displaying search entry fields in connection with the selection of Test Requests tab 602. Repository 604 may display checkbox Repo Tool1 614, checkbox Repo Tool2 616, and Repo Tool3, 618. A user may select one of checkboxes 614-618. Search entry field Repository Url 606 may be configured to accept a repository url for the specific tests.

A user may input a user identification ("ID") into search entry field 608. A user may input a password into search entry field 610.

Once a user's first test request is executed and completed, the execution server may maintain historical data of the user's behavior and input settings related to the test request of Project 506. The historical data may thereafter be used in connection with configuration parameters. Such configuration may also have been identified based on past user activity.

In the event that the user submits a second or additional request that may be the same or similar to the first test request, the server is then enabled to, upon submission of the user ID, pre-populate relevant fields on the GUI based on the user's history.

Test File 612 may enable the user to select the different test files to be tested in connection with the test request. Non-Concurrency Tags 620 may enable a user to tag each of test files at 612. The tag names set at 620 may define whether there may be dependencies between test files. For example, in one situation, if several of the Test Files 612 have the same tag name in its corresponding field at 620, they will not be executed concurrently. In another situation, if several Test Files 612 have the same tag name in its corresponding field 620, where each tag name ends with a different number, these files may be executed sequentially. The number in the tag name may define the order of execution.

The system's display of GUI 600 may be based, at least in part, on stored user-related data. Exemplary pre-populated fields may include entry fields Repository 604 and Repository URL 606. Exemplary data that may be displayed based on the stored user-related data may include test files 612 and Non-Concurrency Tags 620.

Figure 7:
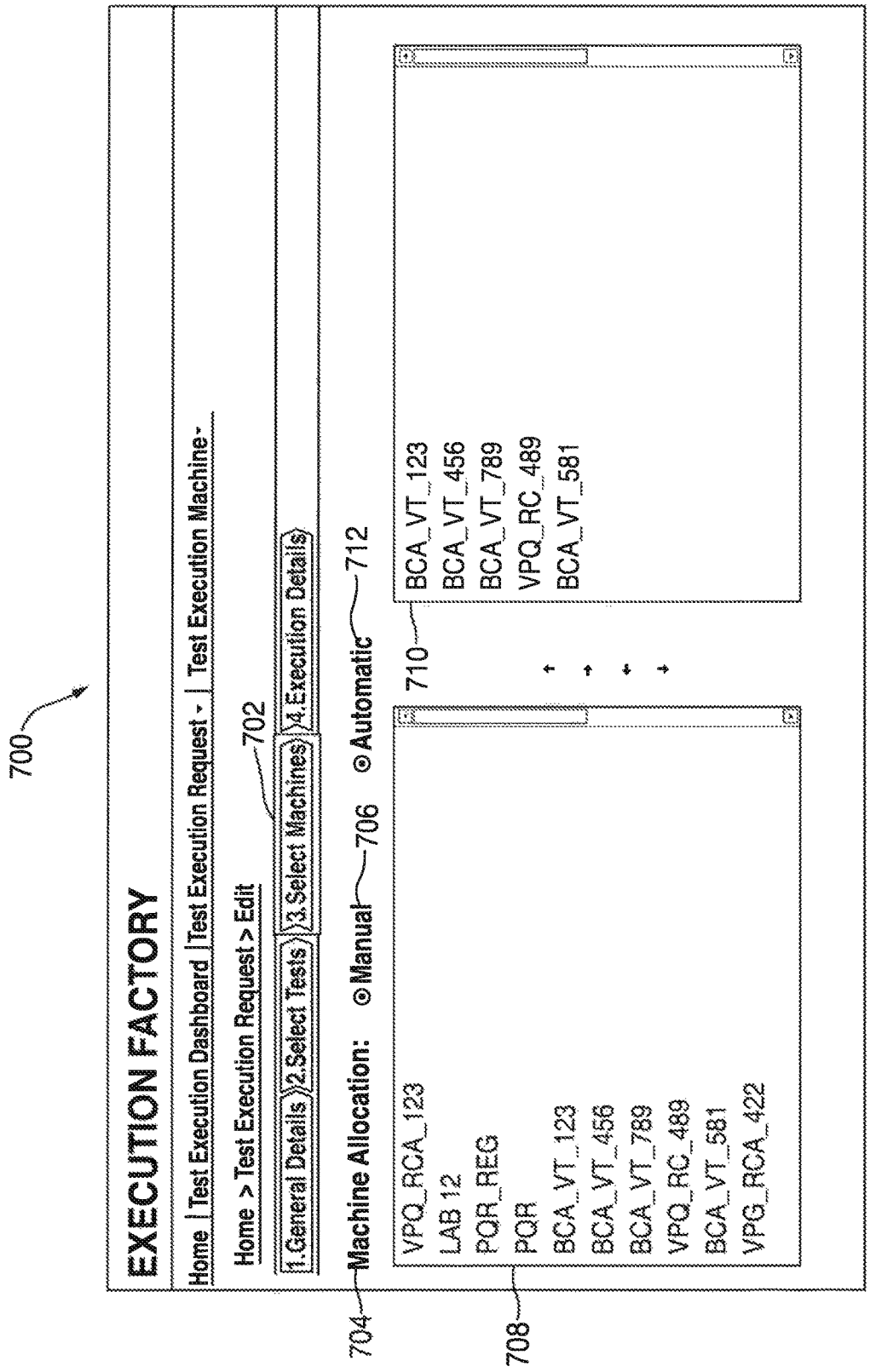
FIG. 7 shows illustrative portions of a GUI in accordance with principles of the invention.

FIG. 7 shows illustrative portions of GUI 700 in accordance with principles of the invention. GUI 700 may be a third GUI displaying search entry fields in connection with the selection of agents tab 702 for the test request. Checkbox 706 may enable the user to manually allocate the agents to be used in the test request. In the event that the user selects checkbox Manual 706 for agent allocation as shown at 704, the available agents may then be displayed at table 708 for manual selection. In the event that the user selects checkbox Automatic 712, all agents that may be assigned to the project may be used to process the current test request.

Preferred agents from the agents listed at 708 may be selected manually and then may be displayed at table 710.

Figure 8:
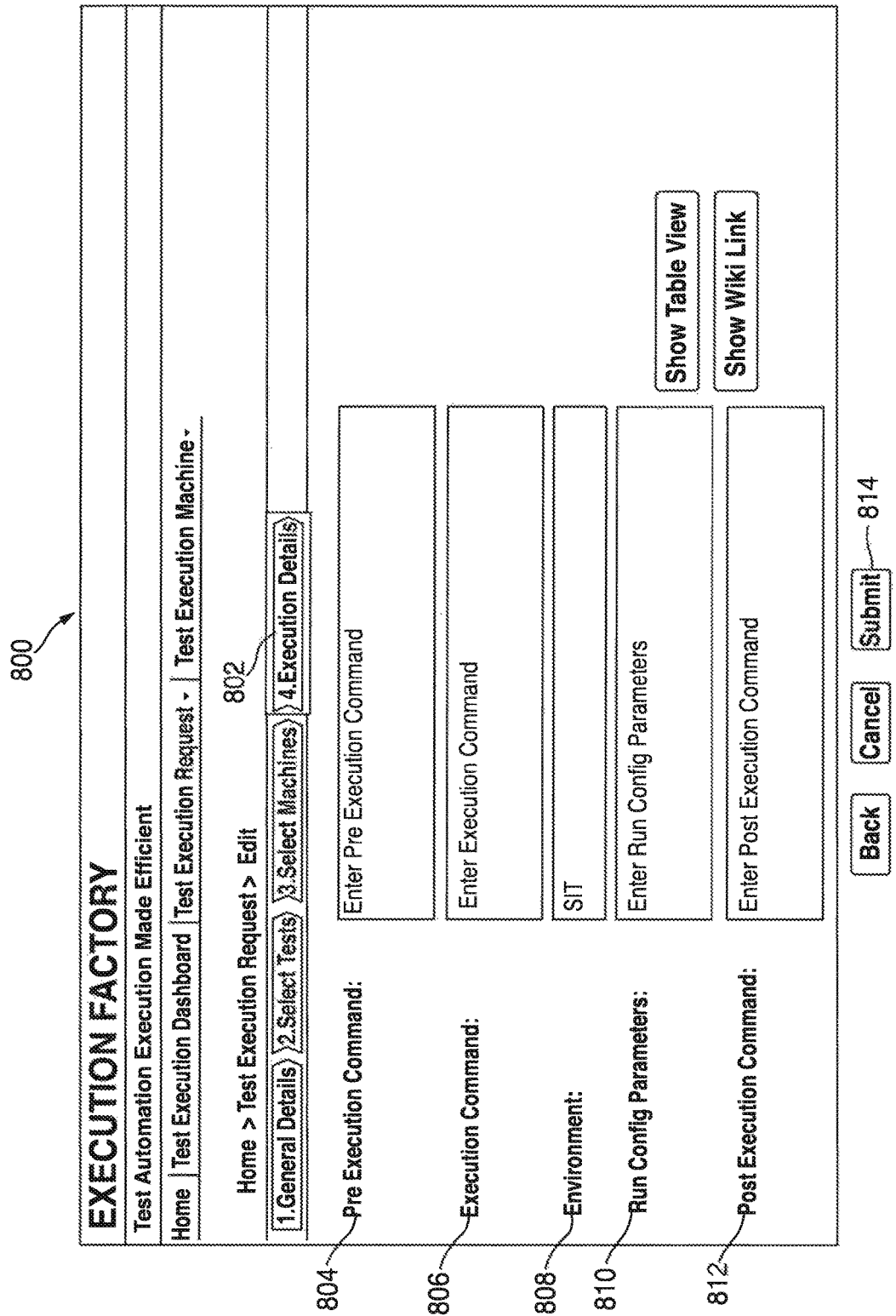
FIG. 8 shows illustrative portions of a GUI in accordance with principles of the invention.

FIG. 8 shows illustrative portions of GUI 800 in accordance with principles of the invention. GUI 800 may be a fourth GUI displaying search entry fields in connection with the selection of Execution Details tab 802 for the test request.

Search entry field Pre-Execution Command 804 may accept a pre-execution command. The Pre-Execution Command 804 may be a command that initiates the pre-execution process. Search entry field Execution Command 806 may accept a command in connection with the actual execution. Execution Command 806 may be a command to the agent associated with the actual execution.

Search entry field Environment 808 may accept a type of environment necessary to perform the execution request. Another search entry field may be displayed at 810. Search entry field Run Configuration Parameters 810 may accept configuration parameters in connection with the test files.

Search entry field Post-Execution Command 812 may be accept a post-execution command. Wherein, upon the user selecting the submit button 814, the selected agents may then begin execution of the test files. The execution may be based on the data submitted in the search entry fields comprised in FIGS. 5, 6, 7, and 8.

FIG. 9 shows illustrative portions of GUI 900 in accordance with principles of the invention. The test execution dashboard may display a summary table for all requests currently in progress, in response to the selection of In-Progress Requests 902. This summary table may display the progress in real-time.

Column Request ID 904 may be configured to display the ID number assigned to the specific test request. Column Request Name 906 may display the name of the test request. The request name may be named based on the type of test request being executed. Column Project Name 908 may be the name given to the project.

Column State 910 may display, in real-time, the status of the request currently in progress. The status may be one or several different states as shown at key 918. The state column may display the status as New 920. This may identify the request as being a new request. State column 910 may display the status as Paused 922. The request may be paused in the event where an error occurs during execution of a test request. The execution server may pause the request until the error has been corrected. During that duration of time, the State column 910 may display the status as paused.

The status may be in a Waiting State 924. In the event that there are no available agents available to execute the test request, the status will be marked as waiting until there is an availability of an appropriate agent. The request may be marked as In Progress 926. This state may identify the request as currently undergoing execution.

Completed State 928 may indicate that the execution of the test request is currently completed. Not Completed state 930 may indicate that the test request began execution but is not yet completed. Closed State 932 may indicate that no further processing and/or manipulation is necessary and the test request is completed.

Column Start Time 912 may display the time the agent began execution of the test request. Column Last Updated 914 may display the time the agent executing the test has last communicated with the server. Column Test File counts 916 may display the state of the test files included in each project. For example, Project Name "PRA" with request ID number "252877" has 6 test files in a completed state and 2 test files not completed. The total is displayed in the test file counts as 8.

Figure 10:
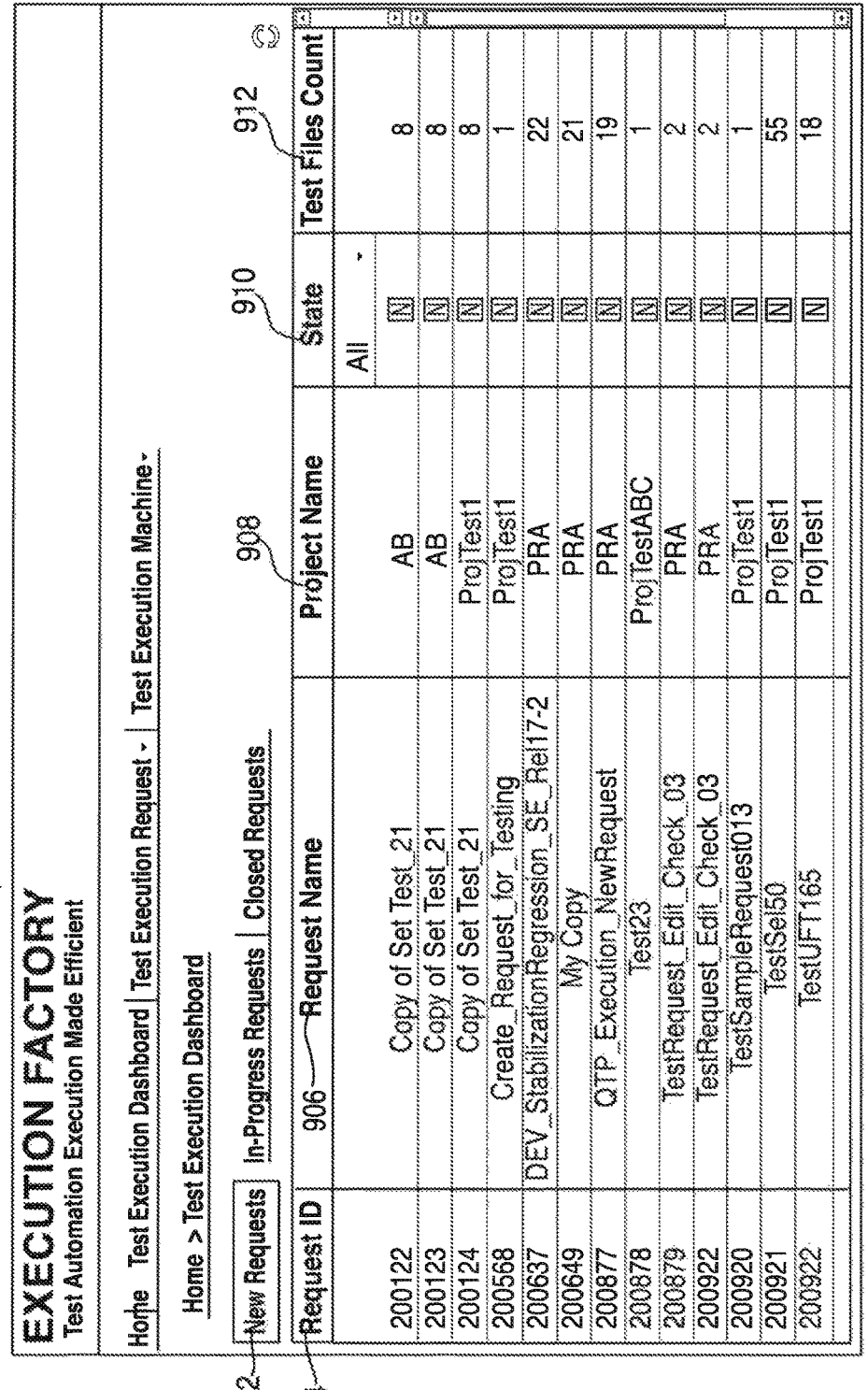
FIG. 10 shows illustrative portions of a GUI in accordance with principles of the invention.

FIG. 10 shows illustrative portions of GUI 1000 in accordance with principles of the invention. The test execution dashboard may display a summary table for all new requests in response to the selection of New Requests 1002. The GUI may include column Request ID 904, column Request Name 906, column Project Name 908, column State 910, State Type 918, Test-Files-Count total 912, as described in detail above in relation to FIG. 9.

FIG. 11 shows illustrative portions of GUI 1100 in accordance with principles of the invention. The test execution dashboard may display a summary table for all closed requests in response to the selection of Closed Requests 1102. The summary table displayed in response to the selection of Closed Requests 1102 may display all projects for which the request is in a closed state. The GUI may include request Columns ID 904, Request Name 906, Project Name 908, State 910, State Types 918, Start Time 912, Last Updated 914, Test File Counts 916 as described in detail above in relation to FIG. 9.

FIG. 12 shows illustrative portions of GUI 1200 in accordance with principles of the invention. GUI 1200 may display a summary of the agents upon selection of the Agents tab 1202. Column Agent Name 1204 may display the name of the agent. Agent Name 1204 may be the name assigned to the agent. Column Status 1206 may display, in real-time, the status of the Agent 1204. The status may display a symbol in connection with one or several different states as shown at key 422 in FIG. 4.

GUI 1200 may display a summary of the test files that have been executed upon selection of the Test Files tab 1208. The summary may display an ID 1210, a Name 1212, and Status 1214, for each test file.

FIG. 13 shows illustrative portions of GUI 1300 in accordance with principles of the invention. GUI 1300 may display a summary of all the test files within project 1318. Project 1318 may be associated with a user 1316. Column test file name 1304 may display the name of the test file. Column agent name 1306 may display the name of the agent that is linked to, and will either execute or has previously executed, the test file in column 1304.

Column state 1308 may display one or more of the states of the test file. The states are shown at key 918 in connection with FIG. 9. If the agent has initiated execution, start time 1310 may display the time the execution of the test file began. Duration 1312 may display the amount of time the execution took for the test file in column 1304. Test case counts 1314 may display a count of the status for each of the test files included in the project 1318. For example, test file number one failed execution a total of 5 times. Test case count 1314 may include a count for the total number of times a file may have passed, failed, warned and/or skipped.

Option button 1322 may enable the user to make a copy of the current test request and create a new request. Option button 1324 may enable the user to edit the current test request. Option button 1326 may enable the user to pause the current request being executed. Option button 1328 may enable the user to close the current request. Upon selection of option button 1328, changes or other related action may not be permitted.

Figure 14:
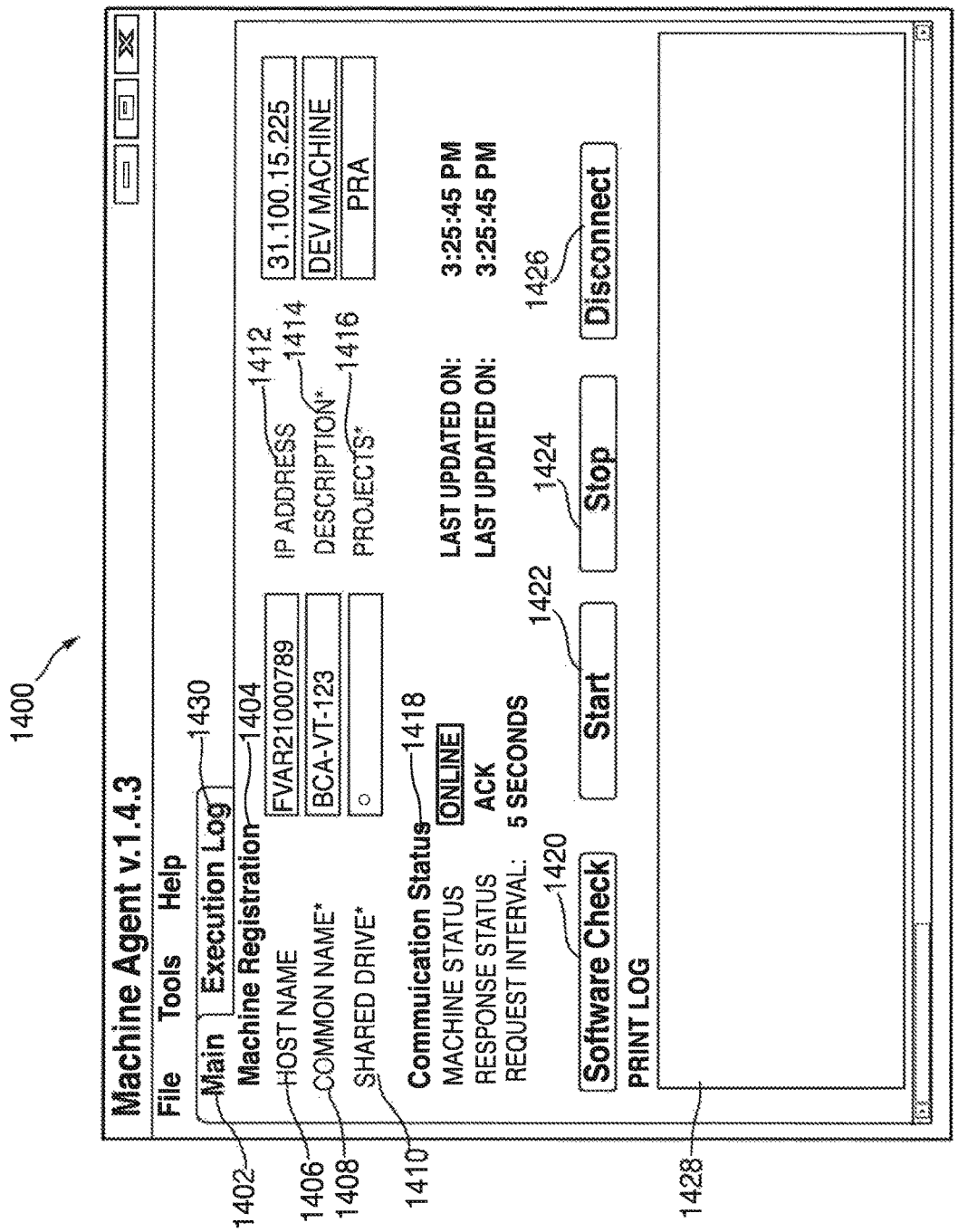
FIG. 14 shows illustrative portions of a GUI in accordance with principles of the invention.

FIG. 14 shows GUI 1400. GUI 1400 may be a graphical user interface for inputting machine agent information. GUI 1400 may be open to main tab 1402. Main Tab 1402 may include Machine Registration section 1404. Machine Registration section 1404 may include Host Name entry field 1406. Host Name entry field 1406 may accepts host name information. Host name information may be a name of a server, or host, that may accommodate the agent being entered into GUI 1400.

GUI 1400 may also include Common Name entry field 1408. Common Name entry field 1408 may include the name of the entered agent into GUI 1400. GUI 1400 may include Shared Drive entry field 1410. Shared Drive entry field 1410 may include information corresponding to a shared drive. The shared drive may be used by the entered agent. GUI 1400 may include IP address entry field 1412. IP address entry field 1412 may accept IP address information relating to the entered agent. It should be appreciated that, in some embodiments, the IP address may be automatically retrieved independent of user input. The IP address may correspond to the server with which the agent is associated. GUI 1400 may also include description entry field 1414. Description entry field 1414 may accept a description of the agent. GUI 1400 may also include projects entry field 1416. Projects entry field 1416 may accept information relating to project types that the agent is configured to execute.

GUI 1400 may also include communication status section 1418. Section 1418 may display the current status of the agent, including the machine status (online, offline, etc.), the timestamp of the most recent machine status update, the response status (acknowledged, not acknowledged, etc.), the timestamp of the most recent response status update, the request interval (5 second, 10 seconds, etc.) and any other suitable information. GUI 1400 may also enable a user to perform a software check using button 1420. GUI 1400 may also enable a user to start the operation using button 1422. GUI 1400 may also enable a user to end the operation using button 1424. GUI 1400 may also enable a user to disconnect the agent using button 1426. GUI 1400 may also include Print Log 1428.

Print Log 1428 may include printed text information relating to the agent. GUI 1400 may also include Execution Log tab 1430. Execution Log tab 1430 may include a list of executed activities of the agent.

Thus, methods and apparatus for simplifying test execution using real-time monitoring, in a testing environment, have been provided. Persons skilled in the art will appreciate that the present invention can be practiced by other than the described embodiments, which are presented for purposes of illustration rather than of limitation. The present invention is limited only by the claims that follow.

What is claimed is:

1. A test execution architecture for handling test execution requests in a testing environment, the test execution architecture comprising:
   one or more test files, each of said test files comprising one or more test cases for test execution;
   a request for test execution, said request comprising one or more of said test files;
   a plurality of agents, said agents for processing and executing a large number of test execution requests, said processing and executing for producing real-time test execution results, said agents are tool agnostic and are configured to support all standard tools, said agents are scalable and adaptable;
   a graphical user interface ("GUI") configured to display:
      a test execution dashboard comprising input-data-type fields configured to receive identification information of said test files submitted as part of the test execution request;
      an agent dashboard displaying real-time status of tasks associated with each of the plurality of agents; and
      a report viewer configured to display real-time test execution results in a standardized report; and
   an execution server configured to:
      receive said test execution request transmitted via a web-service from the GUI;
      determine a format-type for each of said test files included in said test execution request;
      process the test execution request;
      allocate each of said test files to a selected one of said agents, said allocating being based, at least in part, on said format-type of said test file and a prior execution associated with the selected agent files;
      execute each of said test files, said selected agent processing and running said execution,
      track said execution at said selected agent to determine information relating to said format-type of each of said test files;
      store said information to enable corresponding of one or more selected agents to one or more of said test files with respect to future submissions, wherein:
         in response to submission in said test execution dashboard of a pre-determined format-type test file, said execution server is further configured to allocate the pre-determined format-type test file to an agent that, within a pre-determined, historical time period, performed a test execution request for a same or similar format-type test file;
      transmit, upon completion of said selected agent's processing and running of each of said test files, test execution results from said selected agent to said execution server, said server to publish test execution results in a standardized report; and display said report on said report viewer in said GUI.

2. The architecture of claim 1 wherein the test execution dashboard further comprises limited-selection fields for user data entry.

3. The architecture of claim 2 wherein said limited-selection fields are predictive-type fields thereby enabling limiting user input.

4. The architecture of claim 1 wherein said agent is further configured to communicate, in real-time, the status of each of said tasks, via said web service, to said execution server, and wherein, when an error occurs during a test execution process, said execution server pauses agent's execution, and in the event that the error has been corrected, resumes execution at the same point in the test file process where execution has been paused.

5. The architecture of claim 4 wherein said pause functionality is to prevent new test requests from starting until the error has been corrected.

6. The architecture of claim 1 wherein said execution server is further configured to track the runtime for each format-type test file, said tracking, to predict future executions completion time for a historically previously-determined format type runtime.

7. The architecture of claim 1 wherein said server is configured to publish test execution results in a standardized report.

8. The architecture of claim 1 wherein each of said plurality of agents may, simultaneously, process and run test files in parallel with one another.

9. The architecture of claim 1 wherein said agents are at least one of physical machines and virtual machines.

10. The architecture of claim 1 wherein each test file is accompanied by a tag that is connected to, or otherwise associated with, a tagging system, said tag defining the existence of one or more dependencies between test files.

11. A method for efficient test execution in a testing environment, said method for acting on one or more test execution requests, said one or more test execution requests which may include one or more test files for test execution, said method using an execution server for the handling and the managing of said test execution requests, said method also using a plurality of agents, said agents for processing and executing the test execution requests for being handled and managed by said execution server, said processing and executing for producing real-time test execution results, said server in connection with a GUI wherein said GUI is configured to display, during the process of test execution, one or more of several types of dashboards, one of the dashboards being a test execution dashboard comprising input-data-type fields configured to receive identification information of said test files submitted as part of said test execution request, one of the dashboards being an agent dashboard for displaying real-time status of tasks associated with each of said plurality of agents, one of the dashboards being a report dashboard configured to display real-time test execution results in a standardized report, the method further using one or more web-services configured to communicate and transmit data between said GUI and said execution server, and between said execution server and said plurality of agents, said method utilizing real-time monitoring of said test execution requests and said test execution results, the method comprising:

submitting each of said test execution requests to said test execution dashboard in said GUI;

transmitting, via said web-service, each of said test execution requests, to said execution server;

determining, via said execution server, a format-type for each of said test files comprised in each of said test execution requests;

processing each of said test execution requests via each of said agents, wherein, in the event where said agent does not have a tool configured to complete said format-type test request, said processing further comprising:

retrieving and downloading a configuration file, said configuration file including a file path and an environment, said configuration file enabling a connection between said agents and an application programming interface ("API") associated with a configuration file to enable further execution of said format-type test request; and storing the configuration file to enable corresponding of said one or more agents to one or more of said test files, for future submissions;

allocating each of said test files to said one or more corresponding agents based on said format-type of said test files;

executing each of said test files, wherein, said agents processing said test execution requests connect, in real-time, to said execution server to share and display status of said test execution requests and, upon completion of said agents running said test execution requests, said server further configured to transmit said test execution results via said web-service to said execution server and said execution server configured to publish said test execution results in a standardized report; and displaying said report on said report viewer in said GUI.

12. The method of claim 11 further comprising tracking of information relating to said test execution for each different format-type test file on said agents and, storing said tracking information to enable corresponding of one or more agents to one or more of said test files for future submissions.

13. The method of claim 11 further comprising tracking for each format-type test file, to predict future execution's completion time for a historically previously-determined format type runtime.

14. The method of claim 11 further comprising, allocating, in response to a submission in said test execution dashboard of a pre-determined format-type test file, to an agent that historically performed a test execution for a same or similar format-type test file within a pre-determined time period.

15. The method of claim 14 further comprising, in the event that a pre-determined format-type test file is submitted to said GUI, allocating the pre-determined format-type test file to an agent that historically performed test execution for a same or similar format-type test file enabling re-use of the tool previously downloaded.

16. The method of claim 11 further comprising said test files being associated with a specific project type, said project type that uses a specific framework selected from a group consisting of Cucumber, Selenium, and Unified Functional Testing, as the tool for testing.

17. The method of claim 16 further comprising storing, via said execution server, said association of said project type with said test files, and, wherein, upon a submission of a new test file similar to a previously submitted test file, said execution server automatically associating the appropriate project type and tools necessary to perform the execution of the test file.

18. The method of claim 11 wherein, in the event where said agent does not have a tool configured to complete said format-type test request, said agent is further configured to:
   retrieve and download the tool to enable further execution of said format-type test request; and
   store the tool to enable corresponding of one or more agents to one or more of said test files, for future intelligent linking.

19. The method of claim 11 further comprising said plurality of agents simultaneously processing and running said test files in parallel with one another.

20. The method of claim 11 further comprising said execution server communicating, in real-time, status of each of said tasks, and wherein, when an error occurs during a test execution process, said execution server pauses agent's execution, and in the event that the error has been corrected, resume execution at the same point in the test file process where execution has been paused.

21. A test execution architecture for handling test execution requests in a testing environment, the test execution architecture comprising:
   one or more test files, each of said test files comprising one or more test cases for test execution;
   a request for test execution, said request comprising one or more of said test files;
   a plurality of agents, said agents for processing and executing a plurality of test execution requests, said processing and executing for producing real-time test execution results, said agents are tool agnostic and are configured to support all standard tools, said agents are scalable and adaptable;
   a graphical user interface ("GUI") configured to display:
      a test execution dashboard comprising input-data-type fields configured to receive identification information of said test files submitted as part of the request for test execution;
      an agent dashboard displaying real-time status of tasks associated with each of the plurality of agents; and
      a report viewer configured to display real-time test execution results in a standardized report; and
   an execution server configured to:
      receive said test request transmitted via a web-service from the GUI;
      determine format-type for each of said test files included in said test execution request;
      process the test execution request;
      allocate each of said test files to a selected one of said agents, said allocating being based, at least in part, on said format-type of said test file and a prior execution associated with the selected agent files;
      receive, via said web-service, a real-time communication from said selected agent of said status of each of said tasks,
      execute each of said test files, said selected agent processing and running said execution, and, wherein:
         when an error occurs during a test execution process, said execution server pauses said selected agent's execution, said pauses enables preventing new test requests from starting until the error has been corrected; and
         in the event that the error has been corrected, resumes execution at the same point in the test file process where execution has been paused;
      transmit, upon completion of said selected agent's processing and running of each of said test files, test execution results from said selected agent to said execution server, said server to publish test execution results in a standardized report; and
      display said report on said report viewer in said GUI.

22. A test execution architecture for handling test execution requests in a testing environment, the test execution architecture comprising:
   one or more test files, each of said test files comprising one or more test cases for test execution;
   a request for test execution, said request comprising one or more of said test files;
   a plurality of agents, said agents for processing and executing a plurality of test execution requests, said processing and executing for producing real-time test execution results, said agents are tool agnostic and are configured to support all standard tools, said agents are scalable and adaptable;
   a graphical user interface ("GUI") configured to display:
      a test execution dashboard comprising input-data-type fields configured to receive identification information of said test files submitted as part of the request for test execution;
      an agent dashboard displaying real-time status of tasks associated with each of a plurality of agents; and
      a report viewer configured to display real-time test execution results in a standardized report; and
   an execution server configured to:
      receive said test request transmitted via a web-servicer-via from the GUI;
      determine format-type for each of said test files included in said test execution request;
      process the test execution request;
      allocate each of said test files to a selected one of said agents, said allocating being based, at least in part, on said format-type of said test and a prior execution associated with the selected agent files;
      track the runtime for each format-type test file, said tracking, to predict future executions completion time for a historically previously-determined format type runtime;
      execute each of said test files, said selected agent processing and running said execution;
      transmit, upon completion of said selected agent's processing and running of each of said test files, test execution results from said selected agent to said execution server, said server to publish test execution results in a standardized report; and
      display said report on said report viewer in said GUI.

23. A test execution architecture for handling test execution requests in a testing environment, the test execution architecture comprising:
   one or more test files, each of said test files comprising one or more test cases for test execution, each of said test files accompanied by a tag that is connected to, or otherwise associated with, a tagging system, said tag defining the existence of one or more dependencies between test files;
   a request for test execution, said request comprising one or more of said test files;
   a plurality of agents, said agents for processing and executing a plurality of test execution requests, said processing and executing for producing real-time test execution results, said agents are tool agnostic and are configured to support all standard tools, said agents are scalable and adaptable;
   a graphical user interface ("GUI") configured to display:

a test execution dashboard comprising input-data-type fields configured to receive identification information of said test files submitted as part of the request for test execution;

an agent dashboard displaying real-time status of tasks associated with each of a plurality of agents; and a report viewer configured to display real-time test execution results in a standardized report; and an execution server configured to:

receive said test request transmitted via a web-service from the GUI;

determine format-type for each of said test files included in said test execution request;

process the test execution request;

allocate each of said test files to a selected one of said agents, said allocating being based, at least in part, on said format-type of said test and a prior execution associated with the selected agent files;

execute each of said test files, said selected agent processing and running said execution;

transmit, upon completion of said selected agent's processing and running of each of said test files, test execution results from said selected agent to said execution server, said server to publish test execution results in a standardized report; and display said report on said report viewer in said GUI.

* * * * *